April 10, 1962 D. ROSE 3,028,963
WATER SOFTENER AND TREATING SYSTEM
Filed April 9, 1957 7 Sheets-Sheet 4

INVENTOR.
DONALD ROSE
BY

ATTORNEY

United States Patent Office 3,028,963
Patented Apr. 10, 1962

3,028,963
WATER SOFTENER AND TREATING SYSTEM
Donald Rose, 431 W. Rahn Road, Dayton, Ohio, assignor of one-half to Ronald D. Baker, Dayton, Ohio
Filed Apr. 9, 1957, Ser. No. 651,721
3 Claims. (Cl. 210—139)

The present invention relates to a valve for soft water units and it consists in the combinations, constructions and arrangements of parts herein described and claimed.

Generally there is provided a novel valve structure comprising a housing in which there is positioned a plurality of passageways and a plurality of valves certain of which are time controlled. The valve structure is connected with a water main, a house piping system, a drain line, a pair of lines extending to a water softener tank and a line extending to a jet pump which, in turn, interconnects one of the lines from the valve structure to the water softener tank and a line extending to a brine tank. The valve structure is such that when certain of the valves contained therein are actuated by the timer mechanism, the system with which the valve structure is connected may be brined or rinsed, thereafter it may be subjected to a backwash and finally returned to normal water softening operation. The valve structure contains many novel features which will be brought out in the specification.

It is accordingly an object of the invention to provide a novel valve structure particularly adaptable for use with water softening systems.

Still another object of the invention is to provide a novel time controlled valve system.

A further object of the invention is to provide a device of the character set forth which is compact in nature yet effective and efficient in use.

Still another object of the invention is to provide a novel time controlled valve structure having means for controlling the various phases of operation of a water softening system.

Another object of the invention is to provide, in a valve structure of the character set forth, novel pressure actuated valves forming a part of the invention.

A further object of the invention is to provide, in a valve structure of the character set forth, novel means for utilizing main pressure for the actuation of certain valves forming parts of the invention.

Other and further objects of the invention will become apparent from a reading of the following specification taken in conjunction with the drawings, in which.

Referring more particularly to the drawings, there is shown therein a valve structure generally indicated at 10 which, as shown, is comprised of three superposed horizontally extending blocks 11, 12 and 13, the blocks being interconnected as a unit by a series of four vertically extending screws 14.

In one face of the block 13 there is provided a recess 15 in which is threaded or otherwise connected a hard water inlet pipe 16 which is, in turn, connected to the usual water main. There is also provided a recess 17 in which is threadably connected a soft water supply pipe 18 which is, in turn, connected to the conventional supply pipes of a building. In the opposite face of the block 13 and directly opposite to the recess 15 there is provided a recess 19 in which a pipe 20 is threaded and there is also provided a recess 21 opposite the recess 17 wherein a pipe 22 is threaded.

A water pressure chamber is formed by a recess 23 in the upper face of the block 12 which recess 23 is in registry with a recess 24 in the lower face of the block 11. A diaphragm 25 is compressed between the upper face of the block 12 and the lower face of the block 11. A centrally disposed opening 26 in the upper face of the block 11 communicates with the upper portion 24 of the pressure chamber.

A laterally extending plate 27 is affixed to the underside of the diaphragm 25 by a vertically extending bolt 28 provided with the usual washer, nut, et cetera and with a stabilizing plate 29 lying atop the diaphragm 25.

The recesses 15 and 19 are separated by a wall 30 having a centrally disposed horizontal portion 31 provided with an opening 32. A chamber 33 is formed in the block 12 immediately above the opening 32 and extends into the lower portion of the block 12. A horizontal passage 34 interconnects the chamber 33 with the recess 15 and a horizontal passage 35 interconnects the opening 32 with the recess 19.

A wall 36 separates the recesses 17 and 21 and is provided with a horizontal portion 37 having a vertical opening 38 therein. A chamber 39 is formed in the block 13 above the opening 38 and extends into the lower portion of the block 12. A horizontal passage 40 interconnects the chamber 39 with the recess 17 while a horizontal passage 41 interconnects the recess 21 with the opening 38.

To the end portions of the plate 27 there is affixed the upper ends of valve stems 42 and 43 which are vertically slidable in suitable openings in the block 12 and terminate in lower valves 44 and 45 which are adapted to seat respectively in the openings 32 and 38. An annular opening 46 extends upwardly into the block 12 in concentric relation to the stem 42 and communicates at its lower end with the chamber 33. An upper valve 47 is mounted upon the stem 42 and is adapted to seat in the lower end of the annular end of the annular opening 46. An annular chamber 48 extends in concentric relation to the stem 43 upwardly into the block 12 and communicates at its lower end with the upper end of the chamber 39 and an upper valve 49 is mounted upon the stem 43 and is adapted to seat in the lower end of the annular opening 48.

A passageway 50 extends through the block 12 and interconnects the annular openings 46 and 48 centrally disposed in the block 13. In parallel relation to the recesses 15 and 17 is an elongated opening 51 which terminates on that side of the assembly 10 having the fittings 16 and 18 therein in a drain pipe fitting 52 and which terminates at its other end in spaced relation to the opposite wall. A chamber 53 is formed in the upper portion of the block 13 and lower portion of the block 12 and is provided with an opening 54 at its lower end which opening 54 communicates with the opening 51. A valve stem 55 extends slidably through the block 13 and a bearing block 56 is formed integrally therewith in the opening 51 into the chamber 53 and terminates at its upper end in a valve 57 which is adapted to seat in the opening 54.

A passage 58 extends through the blocks 12 and 13 from the lower portion of the chamber 53 to the lower portion of the chamber 23. A passageway 59 extends through the blocks 12 and 13 to interconnect the upper end of the chamber 53 with the passage 35.

A chamber 60 is formed in the upper portion of block 13 and lower portion of block 12 and communicates at its lower end with the rearward portion of the opening 51. A chamber 61 is provided in the block 12 immediately above the chamber 60 and communicates therewith by an opening 62.

A valve stem 63 extends vertically and slidably through the block 13, through the opening 51, through the chamber 60 and into the chamber 61 and has affixed to its upper end a valve 64 which is adapted to seat in the opening 62. A valve 65 is affixed to the stem 63 within the chamber 60 and is slidable in such chamber.

A passage 66 interconnects the recess 21 with the lower portion of the chamber 60 and extends through the block 13. A passage 67 is formed in the block 12 and interconnects the passage 50 with the upper portion of the chamber 60. A passageway 68 extends from the chamber 61 through the block 12 to communicate with a pipe 69. Compression springs 70 and 71 extend from the annular openings 46 and 48, respectively, to bear against the upper faces of the valves 47 and 49, respectively, to normally seat the valves 44 and 45, likewise respectively.

Figure 15:
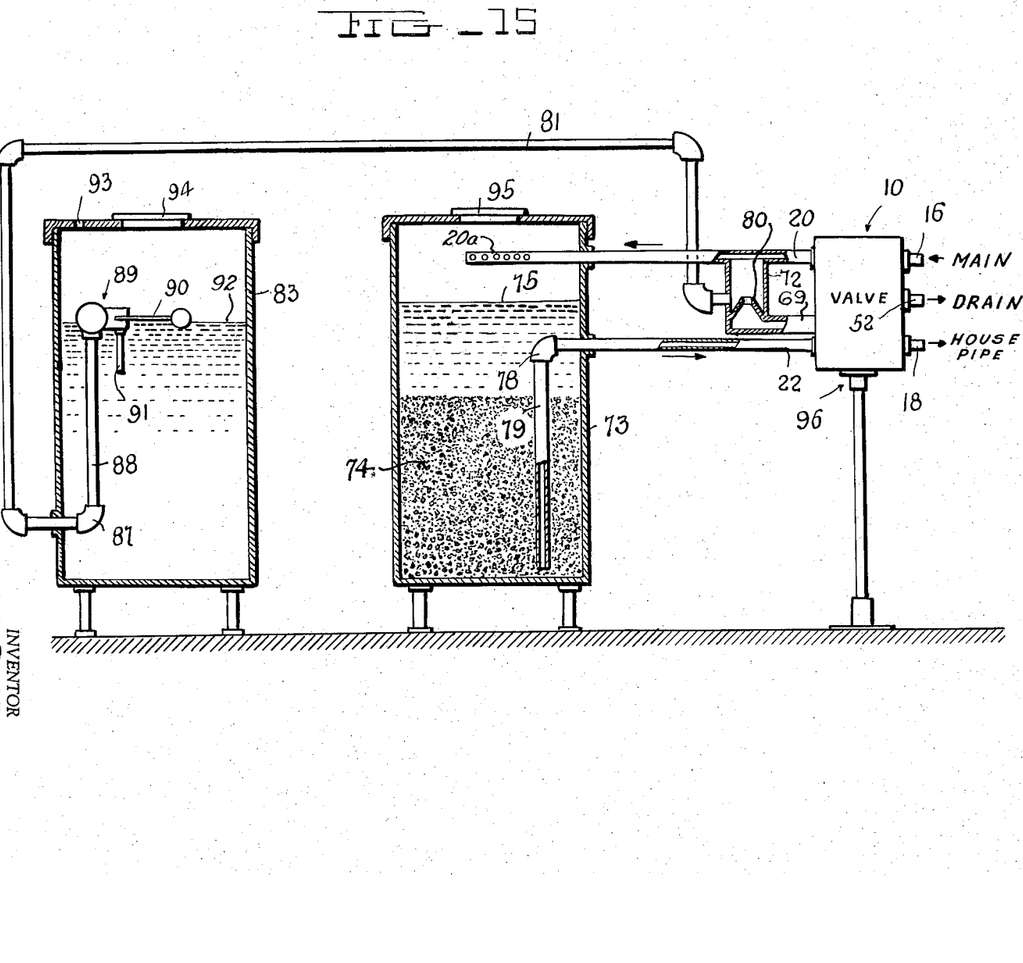
FIGURE 15 is a view of a water softening system utilizing the valve structure of the present invention and showing certain parts thereof in elevation and certain parts thereof in section.

Referring now to FIGURE 15, it will be seen that the pipe 69 connects the assembly 10 with a housing 72, the upper portion of a water softener tank 73 in the lower portion of which is a bed of zeolite crystals 74, the normal water level being indicated at 75. The pipe 20 terminates inside the tank 73 in a perforated end 20a, as seen in FIG. 15.

The pipe 22 likewise leads from the valve assembly 10 to the tank 73, and within the tank is connected, as indicated at 78, to a vertical stand pipe 79 whose lower end terminates adjacent the bottom of the tank 73 and well within the bed of crystals 74.

A jet nozzle 80 is mounted within the casing 72 and is directed toward the pipe 20. The housing 72 is connected by a pipe 81 to the lower end portion of the tank 83 and connects, as indicated at 87, with a vertical standpipe 88 at whose upper end is mounted a conventional float valve generally indicated at 89 and provided with the conventional float 90 and discharge pipe 91. The brine within the tank 83 is indicated at 92 and the tank 83 is provided in its top with a vent 93 and hatch 94, the latter being provided so that the brine 92 may be replenished from time to time. The tank 73 is likewise provided with a hatch 95 whereby the zeolite crystals 74 may be changed whenever necessary.

A timing mechanism is generally designated at 96 and, since the same is conventional, it will not be described in detail, it being sufficient for the purposes of the present invention to explain that the timing mechanism 96 merely acts to move the stems 55 and 63 at predetermined times.

In the normal operation of water softening systems, the cycle of operation includes first a change from normal softening operation to backwash operation, next a movement from the backwash operation to the brine draw and rinse operation and finally a return to the softening operation.

In the operation of the present invention, while the conventional cycle may be followed, it is preferred that the system be first changed from its normal softening operation to its brining or rinsing operation, next from its brining or rinsing to its backwash operation and finally a return from the backwash operation to the normal softening operation.

Figure 14:
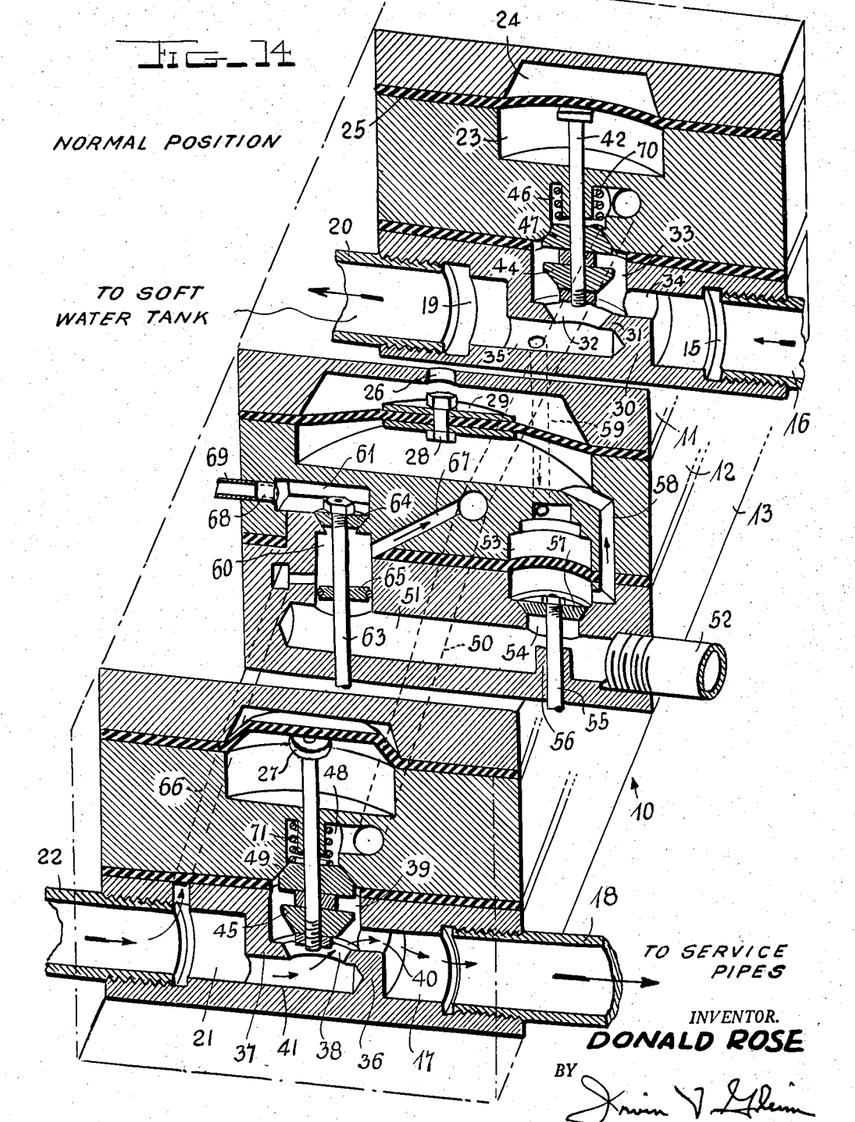
FIGURE 14 is a view similar to the views shown in FIGURES 12 and 13 but showing the valve structure in its normal water softening position.

The position of the various components within the valve assembly 10 when the system is in its normal water softening operation is indicated in FIGURE 14. In FIGURE 14, it will be apparent that water from the main enters at pipe 16, then enters the horizontal passage 34 and flows into the chamber 33 thence downwardly through the opening 32 and then into the pipe 20. Referring now to FIGURE 15, it will be seen that the water now passes through the pipe 20 to inside the tank 73 where it enters the water contained in the tank above the bed of crystals 74. Passing downwardly through the crystals 74, which action softens the water, the thus softened water will now enter the lower end of the stand pipe 79 and thence continue through the pipe 22 where (now again referring to FIGURE 14) it will enter the recess 21 and thence pass to the horizontal passage 41, thence through the opening 38 into the chamber 39, thence through the passage 40 into the pipe 18 and finally into the service pipes for use.

Figure 13:
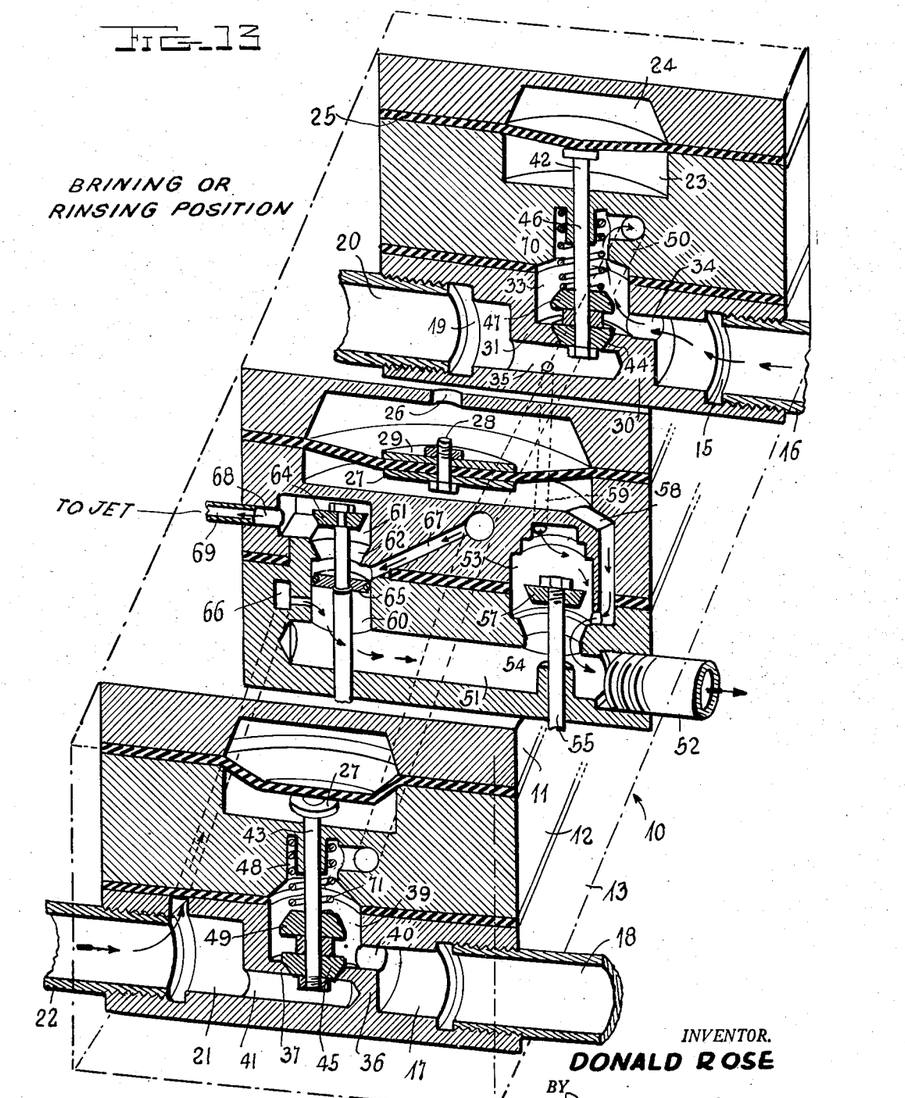
FIGURE 13 is a view similar to FIGURE 12 but showing the valve structure in brining or rinsing position.

At a given time, controlled by the timing mechanism 96, the valve structure will be placed in its brining or rinsing position which is shown in FIGURE 13, it being apparent that the timing mechanism will act to raise the valve 57 from its seat, to raise the valve 64 from its seat 62 and to raise the valve 65 from its lower position shown in FIGURE 14 to its higher position shown in FIGURE 13, the first position of the valve 65 being below the entrance of the passage 66 into the chamber 60 and the latter position of the valve 65 being above the entrance of the passage 66 in the chamber 60.

In such brining or rinsing position illustrated in FIGURE 13, water will again enter the valve structure through the pipe 16 where it will pass through the horizontal passageway 34 into the chamber 33 thence upwardly and into the passageway 50, thence through the passage 67 into the chamber 61 due to the valve 64 now being raised and will thence pass into the pipe 69. Referring again now to FIGURE 15, it will be seen that the pipe 69 carries the water to the housing 72 where it will rise to pass into the pipe 20. This action causes a jet of water to pass outwardly from the jet nozzle 80 thus bringing brine from the tank 83 through the opening of pipe 91 and finally to the jet nozzle 80. The intermingled hard water and brine water will now pass through the bed of crystals 74 and thence into the stand pipe 79 to the pipe 22. Referring again to FIGURE 13 the thus treated water leaving the pipe 22 will pass into the passageway 66 to the chamber 60, thence into the opening 51 and eventually to the drain pipe 52.

It will be seen that during the brining or rinsing operation just described, that there will be no water pressure upon the underside of the diaphragm 25 due to the fact that the valve 57 is in opened position and communication to the underside of the diaphragm is now open between the same and the drain 52 through the passage 58. In the previously described position, namely the normal position shown in FIGURE 14, the valve 57 being closed, water pressure from the mains is communicated to the underside of the diaphragm 25 through the passageway 59, chamber 53 and passage 58, thus lifting the diaphragm and consequently the valves 45 and 44 against the action of the springs 71 and 70, respectively.

Now again due to the action of the timing mechanism 96 the valves 64 and 65 are returned to their downward position previously shown in FIGURE 14 while the valve 57 is allowed to remain unseated, that is to say in its raised position. In this backwash position, water will, as usual, enter the pipe 16 from the water main and thence pass into the chamber 33 through the passage 34. It will then move upwardly to the passage 33 thence into the passage 67 to the chamber 60 thence through the passageway 66 to the pipe 22.

Referring now again to FIGURE 15, it will be seen that the water will now be directed from the pipe 22 to the stand pipe 79 where it will be discharged in the lower portion of the bed of crystals 74 after which it will enter the pipe 20 and return again to the valve structure 10, it being understood that the water level 75 will rise to encompass the portion 20a during this operation.

Figure 1:
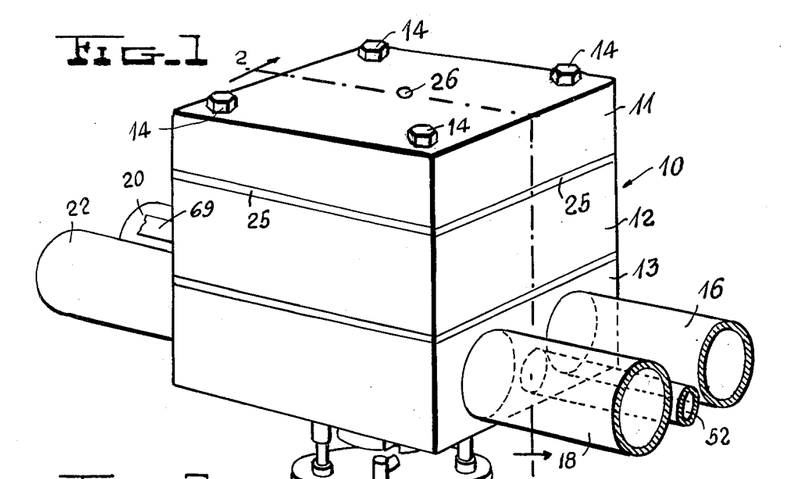
FIGURE 1 is a perspective view of a valve structure forming a part of the invention.
Figure 2:
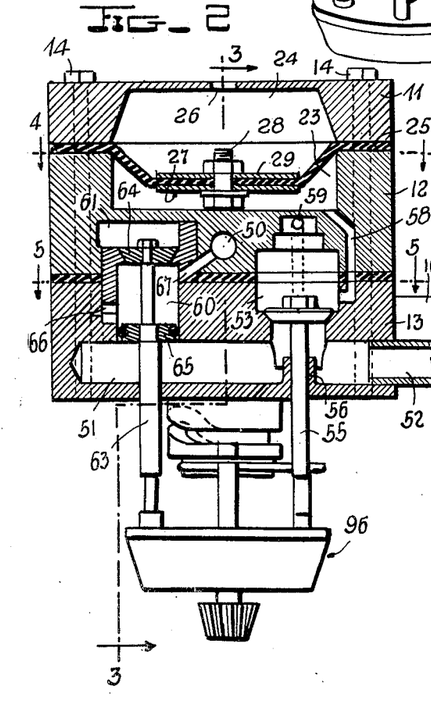
FIGURE 2 is a sectional view, partly in elevation, taken along line 2—2 of FIGURE 1.
Figure 3:
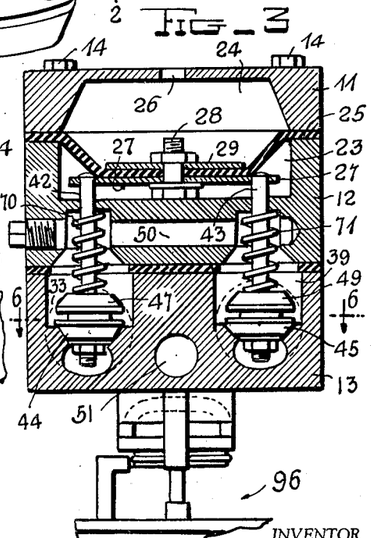
FIGURE 3 is a sectional view taken along line 3—3 of FIGURE 2.
Figures 4, 5:
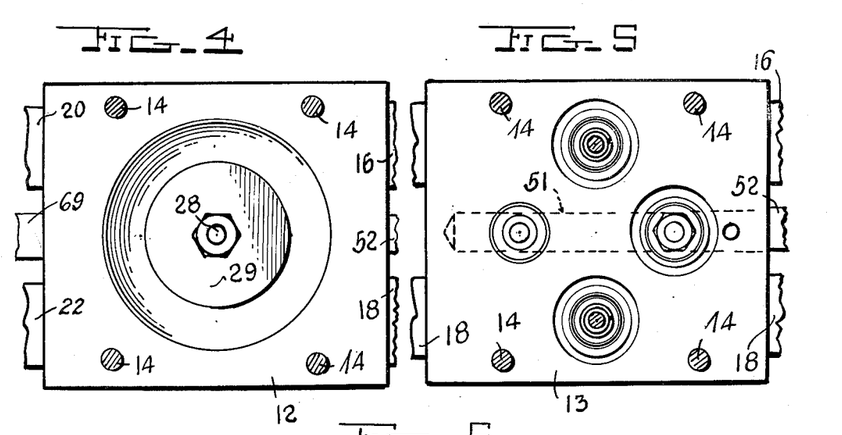
FIGURE 4 is a sectional view taken along line 4—4 of FIGURE 2.
FIGURE 5 is a sectional view taken along line 5—5 of FIGURE 2.
Figure 6:
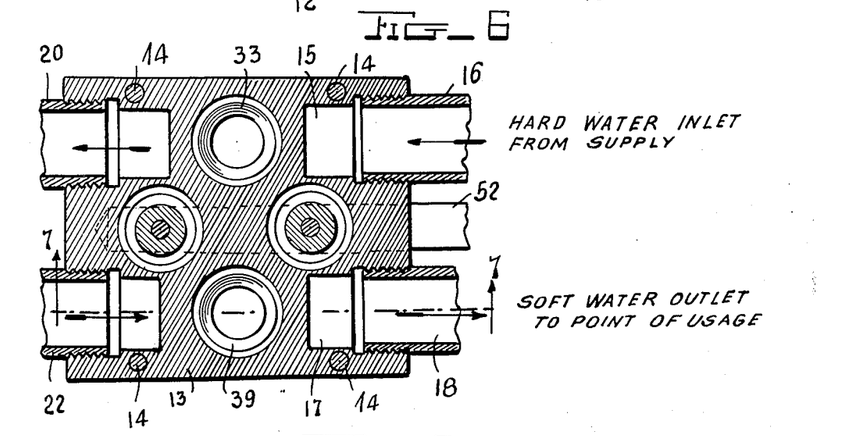
FIGURE 6 is a sectional view taken along line 6—6 of FIGURE 3.
Figure 7:
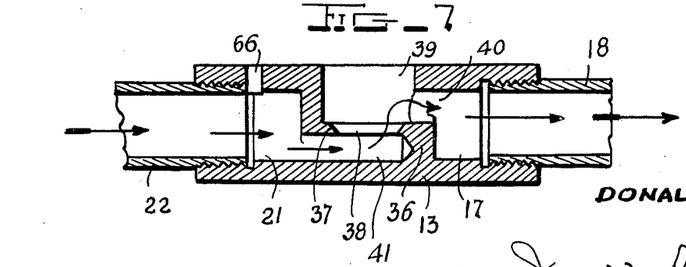
FIGURE 7 is a sectional view taken along line 7—7 of FIGURE 6.
Figure 8:
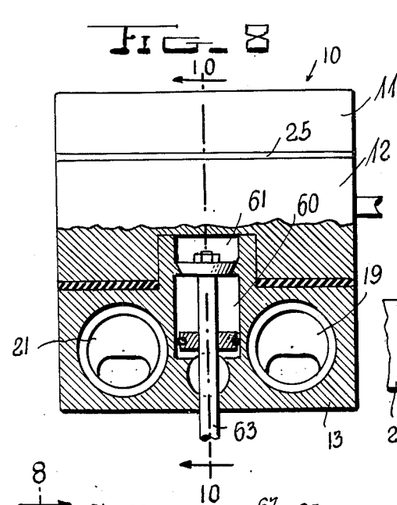
FIGURE 8 is a fragmentary sectional view taken substantially along line 8—8 of FIGURE 10.
Figure 9:
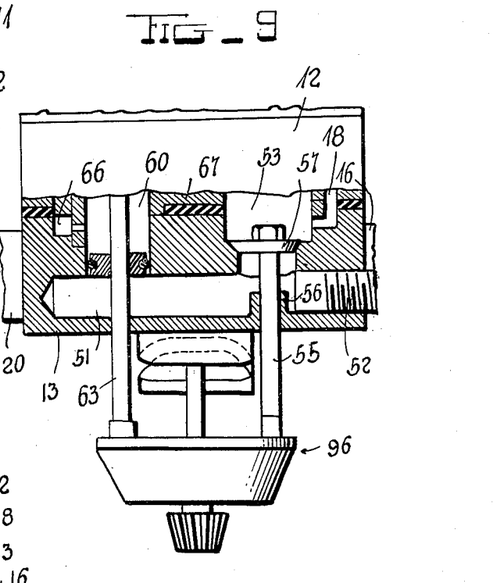
FIGURE 9 is a fragmentary sectional view, partly in elevation, similar to FIG. 10 showing another position of the valves.
Figure 10:
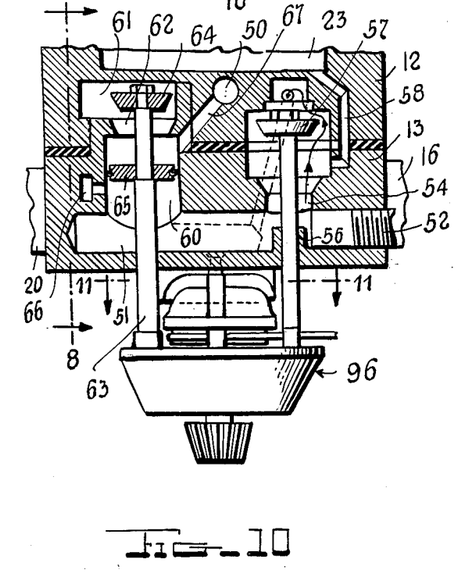
FIGURE 10 is a fragmentary sectional view taken substantially along line 10—10 of FIGURE 8.
Figure 11:
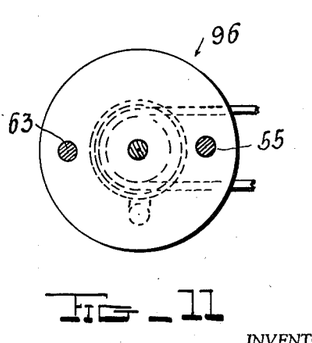
FIGURE 11 is a sectional view taken along line 11—11 of FIGURE 10.
Figure 12:
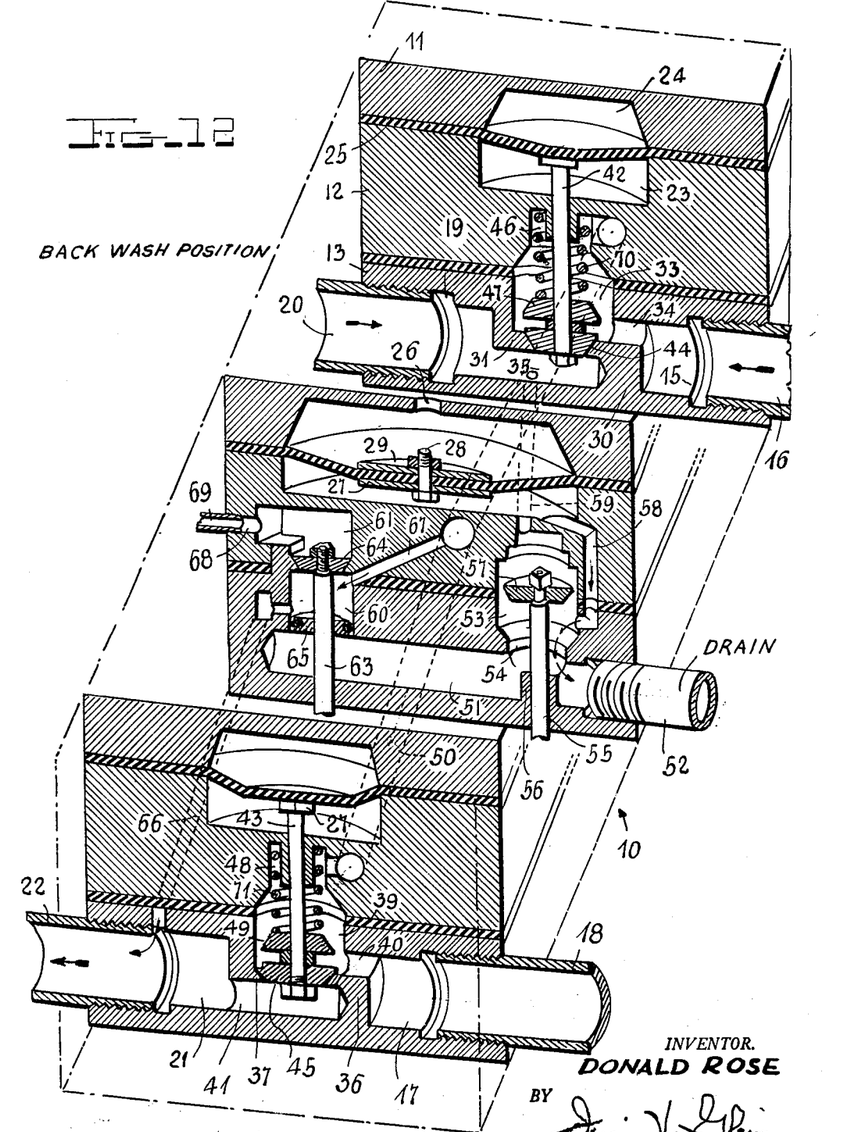
FIGURE 12 is an isomatic exploded schematic showing of the valve structure illustrated in FIGURE 1 illustrating the same in back wash position.

Referring now back to FIGURE 12, it will be seen that the water discharged from the pipe 20 will enter the passageway 35 and then move through the passage 59 to the chamber 53 and, the valve 57 now being open will pass downwardly through such chamber 53 and into the drain 52. Thus, at any time that valve 57 is open, allowing the water to flow from pipe 16 to passage 50, the water also will flow into pipe 18.

After the tank 73 and its bed of crystals 74 has thus been backwashed for a sufficient time, the time control mechanism 96 will again return the various valves to their normal position shown in FIGURE 14.

While but one form of the invention has been shown and described herein, it will be readily apparent to those skilled in the art that many minor modifications may be made without departing from the spirit of the invention or the scope of the appended claims.

What is claimed is:

1. In a water treating system having a brine tank, a water softening tank having a bed of water treating crystals therein, a valve structure comprising a valve body and a jet housing having a jet pipe therein, said valve body having a hard water inlet passageway leading to a hard water outlet passageway, a first pair of valves mounted one above the other on a common actuator stem, one of said valves closing off said hard water passageway in down position, a common hard water passageway in said body being connected with said hard water inlet passageway through the upper one of said pair of valves, a house supply passageway connected with a soft water passageway in said body having a soft water inlet leading thereto, a second pair of valves mounted one above the other on another common actuator stem, one of said second pair of valves closing off the soft water passageway connection with said house supply passageway when in down position, said common hard water passageway connecting with said house supply passageway through the other of said second pair of valves when said one of the second pair of valves is in said down position, a drain chamber and outlet in said body having a drain cutoff valve between said chamber and drain outlet, a continuously open passageway in said body connecting said hard water outlet passageway and said drain chamber, a pressure chamber and pressure operator therein connected with said stems of said pairs of valves for operating the same, a passageway connecting said pressure chamber and said drain chamber, a passageway connecting said soft water inlet in the body with said drain outlet, a second pressure actuating chamber having a third pair of valves on a further common stem, a passageway connecting said common hard water passageway and said second pressure actuating chamber, a jet operating outlet passageway connected with said second pressure actuating chamber, one of said third pair of valves in one position controlling pressure supply to said jet outlet passageway and the other of said third pair of valves controlling the passageway connecting said soft water inlet with the drain outlet, a jet actuated chamber having a jet connected with said jet outlet passageway, a brine suction pipe connecting said brine tank and jet actuating chamber, a brine and water discharge pipe connecting said jet actuated chamber and the upper end of said softening tank, pipe means connecting the hard water outlet of said valve body and said softening tank adjacent the top thereof, a pipe connecting adjacent the bottom of said softener tank and said soft water inlet passageway of the valve body, time-controlled means connected with and for operating said common stem of the third pair of valves and said drain valve, whereby flow of fluid from said hard water inlet pipe is selectively controlled through said body to and from said remaining pipes and passageways.

2. A water treating system according to claim 1 wherein said valve structure body comprises three vertically superposed interconnected blocks consisting of upper, middle and lower blocks whereby said interconnected blocks may be disconnected to provide more ready access thereto, the upper and middle blocks having said pressure chamber and pressure operator therein, pressure being applied in said middle chamber, the middle and lower blocks mounting said first and second pairs of valves while the middle block has mounted therein said respective common actuators for the respective first and second pairs of valves, said second pressure actuating chamber being in said middle block while the stem for the third pair of valves is mounted in the lower block and extends into the third pressure chamber, said drain chamber being formed in said middle and lower block, and actuator stem for said drain valve mounted in said lower block and extending into said drain chamber where said drain valve is mounted thereon.

3. In a water treating system having a brine tank, a water softening tank having a bed of water treating crystals therein, a valve structure comprising a valve body and a jet housing having a jet pipe therein, said valve body having a hard water inlet passageway leading to a hard water outlet passageway, a first pair of valves mounted one above the other on a common actuator stem, one of said valves closing off said hard water passageway in down position, a common hard water passageway in said body being connected with said hard water inlet passageway through the upper one of said pair of valves, a house supply passageway connected with a soft water passageway in said body having a soft water inlet leading thereto, a second pair of valves mounted one above the other on another common actuator stem, one of said second pair of valves closing off the soft water passageway connection with said house supply passageway when in down position, said common hard water passageway connecting with said house supply passageway through the other of said second pair of valves when said one of the second pair of valves is in said down position, a drain chamber and outlet in said body having a drain cutoff valve between said chamber and drain outlet, a continuously open passageway in said body connecting said hard water outlet passageway and said drain chamber, a pressure chamber and pressure operator therein connected with said stems of said pairs of valves for operating the same, a passageway connecting said pressure chamber and said drain chamber, a passageway connecting said soft water inlet in the body with said drain outlet, a second pressure actuating chamber having a third pair of valves on a further common stem, a passageway connecting said common hard water passageway and said second pressure actuating chamber, a jet operating outlet passageway connected with said second pressure actuating chamber, one of said third pair of valves in one position controlling pressure supply to said jet outlet passageway and the other of said third pair of valves controlling the passageway connecting said soft water inlet with the drain outlet, a jet actuated chamber having a jet outlet passageway, a brine suction pipe connecting said brine tank and jet actuating chamber, a brine and water discharge pipe connecting said jet actuated chamber and the upper end of said softening tank, pipe means connecting the hard water outlet of said valve body and said softening tank adjacent the top thereof, a pipe connecting adjacent the bottom of said softener tank and said soft water inlet passageway of the valve body, means for operating said common stem of the third pair of valves and said drain valve, whereby flow of fluid from said hard water inlet pipe is selectively controlled through said body to and from said remaining pipes and passageways.

References Cited in the file of this patent

UNITED STATES PATENTS

| | | |
|---|---|---|
| 1,623,399 | Eisenhauer | Apr. 5, 1927 |
| 1,652,710 | Dotterweich | Dec. 13, 1927 |
| 1,661,676 | Norquist | Mar. 6, 1928 |
| 1,928,384 | McCanna | Sept. 26, 1933 |
| 2,243,815 | Griswold | May 27, 1941 |
| 2,689,006 | Lindsay | Sept. 14, 1954 |
| 2,744,867 | Webb | May 8, 1956 |
| 2,777,515 | Stirling | Jan. 15, 1957 |
| 2,825,359 | Williams | Mar. 4, 1958 |